United States Patent
Raaf

(10) Patent No.: US 7,480,273 B1
(45) Date of Patent: Jan. 20, 2009

(54) METHOD, MOBILE STATION AND BASE STATION FOR DATA TRANSMISSION IN A MOBILE RADIO SYSTEM

(75) Inventor: Bernhard Raaf, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/857,653

(22) PCT Filed: Dec. 1, 1999

(86) PCT No.: PCT/DE99/03806
§ 371 (c)(1),
(2), (4) Date: Jun. 7, 2001

(87) PCT Pub. No.: WO00/35224
PCT Pub. Date: Jun. 15, 2000

(30) Foreign Application Priority Data
Dec. 7, 1998 (DE) ................ 198 56 401

(51) Int. Cl.
*H04Q 7/00* (2006.01)

(52) U.S. Cl. .................. 370/331; 455/436

(58) Field of Classification Search ............. 370/331, 370/332, 333, 334, 337, 347, 348, 350, 442, 370/321, 459, 335, 336, 342, 345, 346; 455/436, 455/437, 438, 442
See application file for complete search history.

(56) References Cited

U.S. PATENT DOCUMENTS

| 5,177,740 | A |   | 1/1993 | Toy et al. |
| 5,239,557 | A | * | 8/1993 | Dent ................ 370/342 |
| 5,570,352 | A | * | 10/1996 | Poyhonen ................ 370/330 |
| 5,661,724 | A | * | 8/1997 | Chennakeshu et al. ...... 370/324 |
| 5,754,542 | A | * | 5/1998 | Ault et al. ................ 370/342 |
| 5,784,695 | A | * | 7/1998 | Upton et al. ................ 455/442 |
| 5,812,542 | A | * | 9/1998 | Bruckert et al. ........... 370/335 |
| 5,828,659 | A | * | 10/1998 | Teder et al. ................ 370/328 |
| 5,978,679 | A | * | 11/1999 | Agre ........................ 455/442 |
| 6,069,880 | A | * | 5/2000 | Owen et al. ................ 370/311 |
| 6,298,095 | B1 | * | 10/2001 | Kronestedt et al. .......... 375/295 |
| 6,308,066 | B1 | * | 10/2001 | Ranta et al. ................ 455/436 |
| 6,493,322 | B1 | * | 12/2002 | Chennakeshu et al. ...... 370/252 |
| 6,532,226 | B1 | * | 3/2003 | Lehtinen et al. ........... 370/347 |
| 6,965,585 | B2 | * | 11/2005 | Grilli et al. ................ 370/331 |
| 6,980,536 | B1 | * | 12/2005 | Schulz et al. .............. 370/337 |
| 2003/0063583 | A1 | * | 4/2003 | Padovani et al. ........... 370/329 |

FOREIGN PATENT DOCUMENTS

| WO | WO 92/10886 | 6/1992 |
| WO | WO 94/29981 | 12/1994 |
| WO | WO 97/25827 | 7/1997 |

OTHER PUBLICATIONS

ETSI SMG2 UMTS-L1#7 Stockholm (Sweden) Oct. 14-16, 1998, Downlink slotted frames for seamless handover from UTRA to GSM.

* cited by examiner

*Primary Examiner*—Chi H. Pham
*Assistant Examiner*—Kevin Mew

(57) ABSTRACT

A method, mobile station and base station for data transmission in a mobile radio system wherein interruption phases are inserted in a UMTS transmission in order to monitor GSM base stations. In order to reduce the number of these interruption phases, the mobile station is switched during these interruption phases to reception of characteristic data packets and of data packets which are to be detected and are transmitted by a GSM base station.

67 Claims, 5 Drawing Sheets

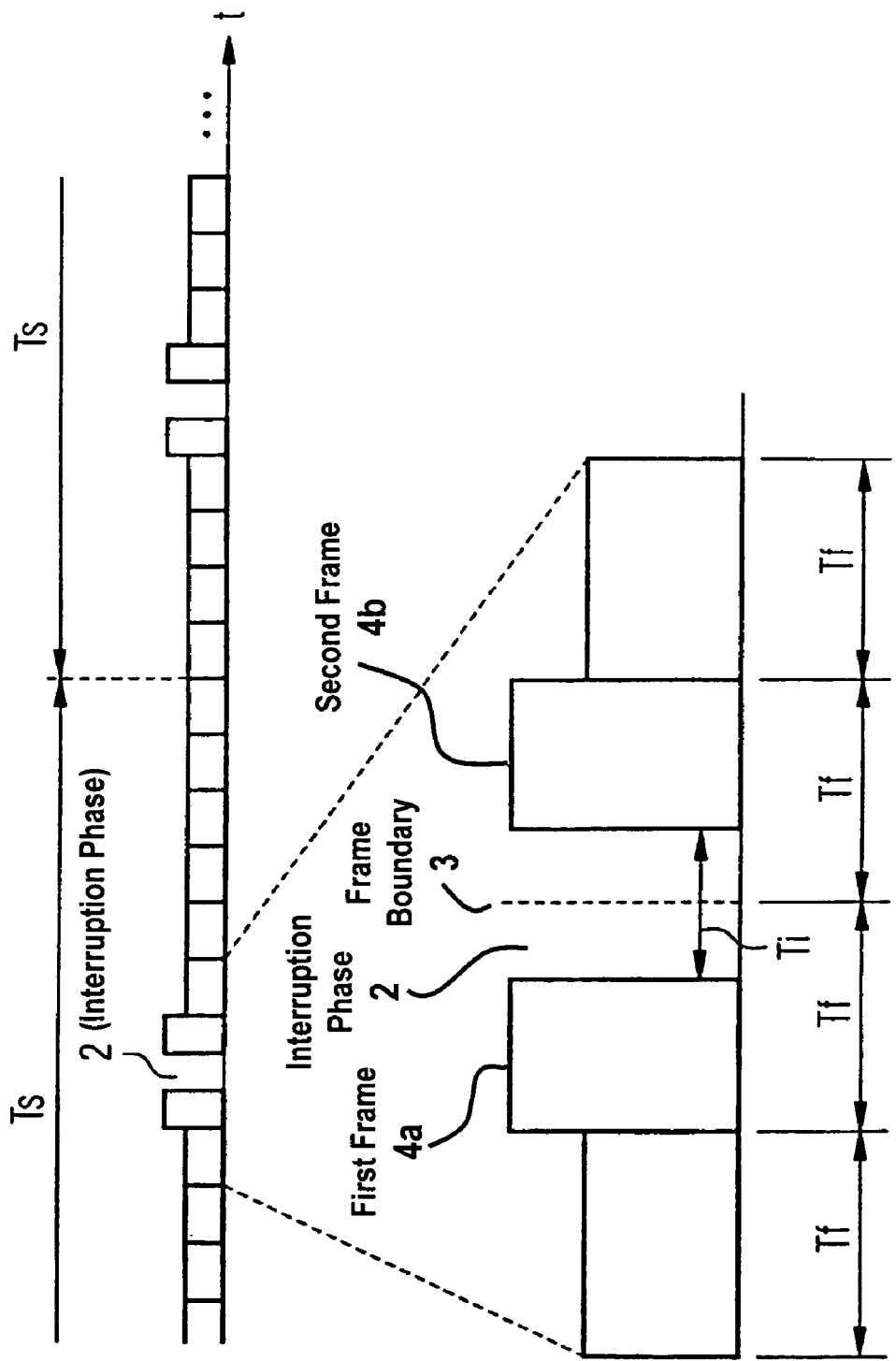

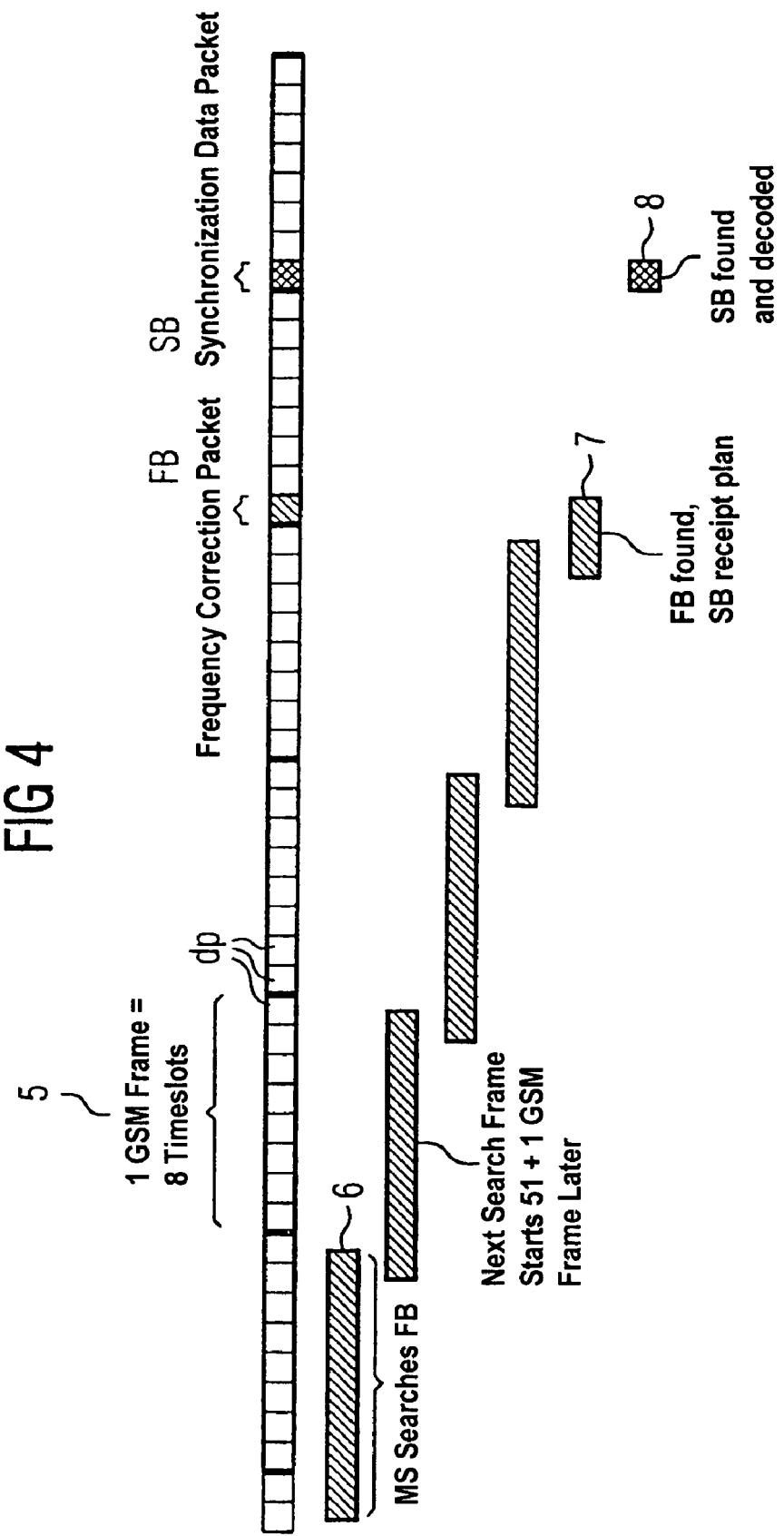

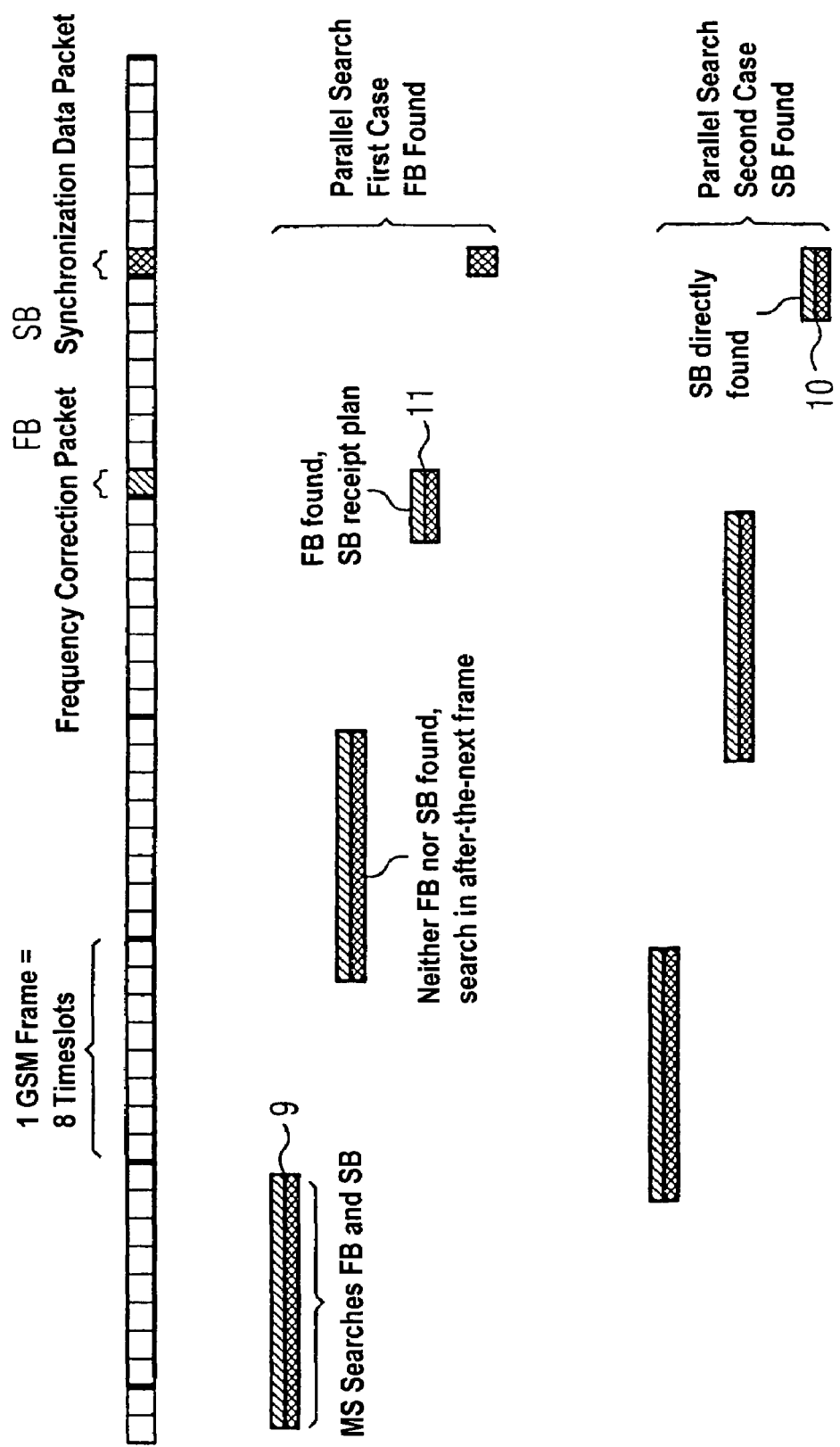

METHOD, MOBILE STATION AND BASE STATION FOR DATA TRANSMISSION IN A MOBILE RADIO SYSTEM

BACKGROUND OF THE INVENTION

1. Field of the Invention

The present invention relates to a base station, a mobile station and a method for data transmission in a communication system, in particular in a CDMA mobile radio system, with the data being transmitted structured into frames in such a manner that it is possible for a mobile station to carry out other functions, in particular to carry out measurements via a receiving device, during one or more interruption phases in which it interrupts the reception (of the previous source or of the data from the base station) and/or the processing of received data or the transmission process. In the following text, the term "transmission" refers to both sending and/or receiving.

2. Description of the Prior Art

In communications systems, data (for example, voice data, image data or system data) are transmitted on transmission paths between base stations and mobile stations. In radio communications systems, this is done with the aid of electromagnetic waves via an air or radio interface. In this case, carrier frequencies are used which lie in the frequency band provided for the respective system. The carrier frequencies for GSM (Global System for Mobile Communication) are in the band around 900 MHz. Frequencies in the frequency band around 2000 MHz are being provided for future radio communications systems, for example the UMTS (Universal Mobile Telecommunication System), which uses a CDMA (Code Division Multiple Access System) method, or other third-generation systems.

Particularly in future CDMA systems, the base station will transmit essentially continuously, for example, in the downlink direction; that is, in the direction from base station to a mobile station. The data transmitted during transmission are normally structured into frames, which each have a predetermined length. The frames may also have a different structure and length, particularly for different services, such as voice data transmission and video data transmission. The structure and/or length of each frame in a continuous sequence of frames is, however, predetermined and/or recognized by the mobile station.

In cellular mobile systems in particular, the mobile station occasionally has to carry out functions other than data reception, which cannot be carried out at the same time, at least when using only a single receiving device. For example, the mobile station in a cellular radio communications system in which the base stations in different cells transmit at different frequencies, from time to time, has to measure whether the radio signals from another base station can be received with good reception quality. To do this, the mobile station sets its receiving device to a different frequency than the frequency at which it is currently receiving data.

In order to allow transmission without interruption from the base station to the mobile station, it has already been proposed for the mobile station to be equipped with a second receiving device. However, this solution is generally rejected in practice for cost reasons.

Another proposal is known from WO-A 9725827, according to which the base station interrupts the transmission at predetermined times in order to allow the receiving station to use its single receiving device to carry out an adjacent channel search or adjacent channel monitoring (search for an adjacent base station or for specific data packets transmitted by these base stations which, in the following text, also may be considered to include synchronization, frequency correction or pilot signal bursts).

In order to avoid loss of data, the base station first of all transmits the data at a higher transmission rate than the essentially constant continuous transmission rate. To prevent this leading to increased bit error rates (BER), the transmission power also needs to be increased during this time.

The frequency at which the interruption phases recur and the length of the interruption phases depend on the respective system and on the respective operating state of the system, as well. Since the deterioration in the transmission quality also increases with the number of interruption phases inserted, it is desirable to insert as few interruption phases as possible, or for the interruption phases to be as short as possible.

An object of the present invention is to specify a method for data transmission in a mobile radio system, a mobile station and a base station, which allows reliable adjacent channel monitoring with a smaller number of interruption phases than in the prior art.

SUMMARY OF THE INVENTION

Accordingly, the present invention is directed toward the concept of, during interruption phases which are inserted into a data stream for synchronization purposes, not only switching to reception of characteristic data packets, but also switching to reception of data packets which are to be detected.

Thus, for example, while data are being transmitted in the downlink direction from a first base station to a mobile station, interruption phases are inserted at least during specific transmission phases. In such interruption phases the mobile station interrupts the reception of the data transmitted by the first base station and/or interrupts the processing of the received data or the transmission process, the mobile station is switched to reception of characteristic data packets and data packets which are to be detected are transmitted by a second base station.

It is thus possible to keep the number and/or duration of interruption phases to be inserted low by utilizing the known frame structure of data transmission from the second base station to the mobile station. It is thus possible to reduce the required effective total duration of the interruption phases, and thus to improve the transmission quality.

A first transmission method, which is used by a first base station, may, in this case, be a CDMA method, and a second transmission method, which is used by a second base station, may be a GSM method. The present invention may, in this case, be part of an uplink or downlink overall concept for a GSM-UMTS dual-mode mobile radio system.

One development of the present invention provides for information which influences the insertion of interruption phases to be transmitted by the mobile station to the first base station as a function of a reception result which is achieved during the interruption phases in which the receiving device is switched to reception of data packets from the second base stations. The reference to influencing the insertion of interruption phases also means limiting the number of future interruption phases and/or ending the insertion of interruption phase and/or controlled continuation of the insertion of further interruption phases and/or controlling the duration of the interruption phases.

It is thus possible to end the insertion of interruption phases as soon as possible and thus to limit it as much as possible as soon as sufficient information about the second base stations to be monitored is known, and hence to improve the transmission quality.

Another embodiment of the present invention provides for the mobile station to be switched successively to reception of data packets from a number of base stations and, as a function of the reception results, for information which influences the insertion of the interruption phases to be transmitted to the first base station.

This makes it possible to monitor a number of adjacent base stations successively, and initially to end the insertion of interruption phases once they have been monitored adequately.

A further embodiment of the present invention provides for the information for influencing the insertion of the interruption phases and information about second and/or third base stations to be transmitted via the same message.

This makes it possible to monitor adjacent base stations and to transmit information about the monitoring results with as little signaling complexity as possible.

Additional features and advantages of the present invention are described in, and will be apparent from, the following Detailed Description of the Preferred Embodiments and the Drawings.

DESCRIPTION OF THE DRAWINGS

FIG. 3 shows a schematic illustration of the insertion of interruption phases during a transmission phase;

FIG. 4 shows a schematic illustration of the synchronization scheme for GSM systems; and FIG. 5 shows a schematic illustration of a design variant of the synchronization scheme according to the present invention.

DETAILED DESCRIPTION OF THE PREFERRED EMBODIMENTS

Figure 1:
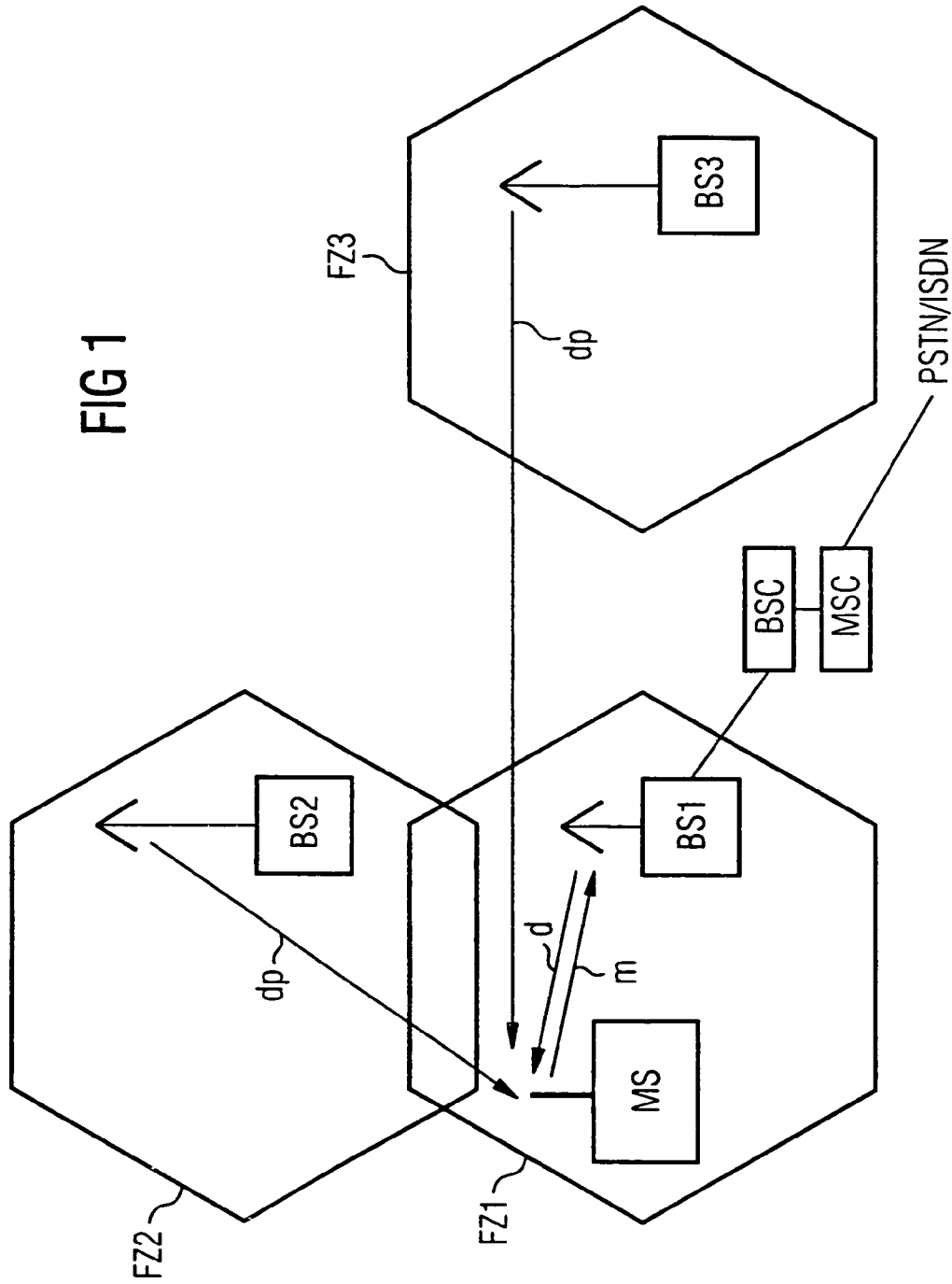
FIG. 1 shows an outline circuit diagram of a mobile radio system.

FIG. 1 shows a cellular mobile radio network which, for example, includes a combination of a GSM (Global System for Mobile Communication) system with a UMTS (Universal Mobile Telecommunication System) system, and which includes a large number of mobile switching centers MSC which are networked with one another and allow access to a landline network PSDN/ISND. Furthermore, these mobile switching centers MSC are each connected to at least one base station controller BSC, which also may be in the form of a data processing system.

Each base station controller BSC is, in turn, connected to at least one base station BS. Such a base station BS is a radio station which can set up a radio link to other radio stations, so-called mobile stations MS, via a radio interface. Information can be transmitted within radio channels, which are within frequency bands, via radio signals between the mobile stations MS and the base station BS associated with these mobile stations MS. The range of the radio signals from a base station essentially defines a radio cell FZ.

Base stations BS and a base station controller BSC can be combined to form a base station system. The base station system BSS is, in this case, also responsible for radio channel administration and allocation, data rate adaptation, monitoring of the radio transmission path, handover procedure and, in the case of a CDMA system, allocation of the spread code sets to be used, and transmits the signaling information required for these purposes to the mobile stations MS.

In the case of a duplex system, different frequency bands may be provided for the uplink (mobile station to base station) than for the downlink (base station to mobile station) in FDD (Frequency Division Duplex) systems such as the GSM system, and different time intervals may be provided for the uplink and downlink for TDD (Time Division Duplex) systems such as the DECT (Digital Enhanced Cordless Telecommunications) system. Within the various frequency bands, a number of frequency channels can be provided via an FDMA (Frequency Division Multiple Access) method.

Terminology and examples used in the course of this application also often relate to a GSM mobile radio system; however, they are in no way limited to this system but, on the basis of the description, can also be mapped by a person skilled in the art onto other, possibly future, mobile radio systems such as CDMA systems; in particular, wide band CDMA systems or TD/CDMA systems. The term first base station BS1 relates in particular to a UMTS base station or a CDMA base station, while the terms second and/or third base stations BS2, BS3 relate in particular to GSM (adjacent) base stations to be monitored, while the term mobile station relates in particular to a dual-mode mobile station, which is designed both for receiving/transmitting GSM signals and for receiving/transmitting UMTS signals or CDMA signals, and may also be set up, if required, for stationary operation.

Figure 2:
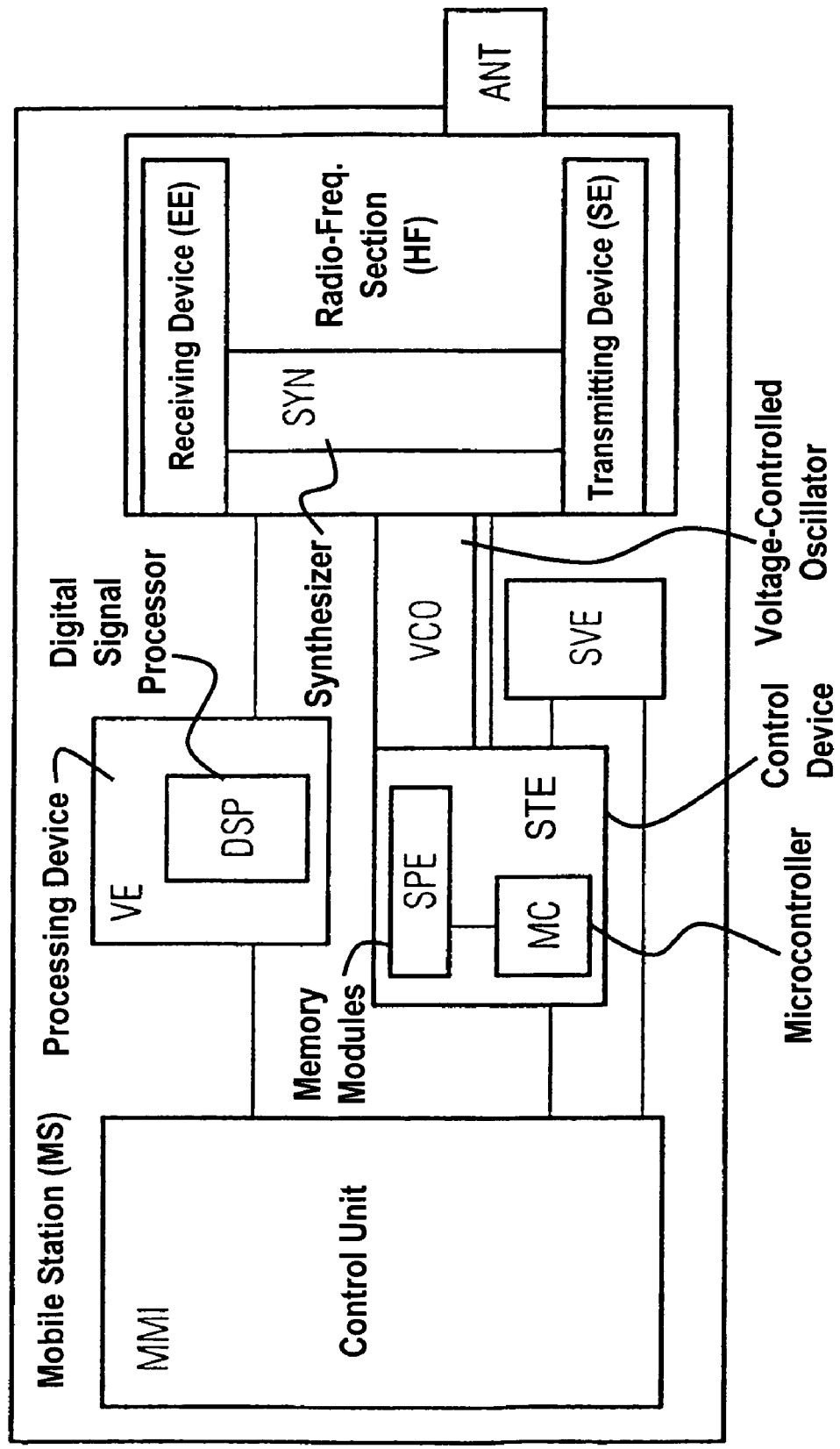
FIG. 2 shows an outline circuit diagram of a mobile station.

FIG. 2 shows a radio station, which may be a mobile station MS, including a control unit MMI, a control device STE, a processing device VE, a power supply device SVE, a receiving device EE and a transmitting device SE.

The control device STE essentially includes a programmable microcontroller MC, which can make write and read access to memory modules SPE. The microcontroller MC controls and monitors all the essential elements and functions in the radio station, controls the communication and signaling process, reacts to keypad inputs by carrying out the appropriate control procedures, and is responsible for changing the appliance to different operating modes.

The processing device VE also may be in the form of a digital signal processor DSP, which can, likewise, access memory modules SPE.

The volatile or non-volatile memory modules SPE are used to store the program data required for controlling the radio station and the communication process, in particular the signaling procedures as well, appliance information, information entered by the user, and information that arises during the processing of signals.

The radio-frequency section HF includes the transmitting device SE, with a modulator and an amplifier, and a receiving device EE, with a demodulator and, likewise, an amplifier.

The transmitting device SE and the receiving device EE are supplied via the synthesizer SYN with the frequency from a voltage-controlled oscillator VCO. The voltage-controlled oscillator VCO also allows production of the system clock, which acts as the clock for the processor devices in the appliance.

An antenna device ANT is provided for receiving and for transmitting signals via the air interface of a mobile radio system.

The radio station also may be a base station BS. In this case, the control unit is replaced by a connection to a mobile radio network; for example, via a base station controller BSC and/or a switching device MSC. In order to interchange data at the same time with a number of mobile stations MS, the base station BS has a corresponding large number of transmitting and receiving devices.

FIG. 3 shows the frame structure for a data transmission with a short delay time; in particular, for voice transmission in a UMTS (Universal Mobile Telecommunications Systems) in which one super frame in each case contains twelve individual frames 1 for data transmission. In this case, the illustration shows a transmission phase in the downlink from a first base station BS1, in particular a UMTS base station BS1, to a mobile station MS, in particular a dual-mode mobile station MS, which is designed not only to receive UMTS data but also to receive GSM data packets. The statements made in the following text are essentially limited to the downlink. However, it goes without saying that the present invention can be incorporated not only in downlink transmission, but also in uplink transmission. The exemplary embodiments described in the following text for the downlink can be incorporated in an uplink transmission within the scope of a person skilled in the art.

The individual frames 1 each have a transmission length Tf of 10 ms, so that the super frame has a total transmission length Ts of 120 ms. The fifth and sixth individual frames 1 each have a common interruption phase 2 which may overlap their frame boundary 3 and which has a length Ti. The length Ti is, for example, 6 ms. The subsections of the first frame 4a, which starts before the interruption phase 2, and of the second frame 4b, which ends after the interruption phase 2, have the same length, or are of the same size. In this case, during the interruption phases, at least the transmission of data to a specific mobile station which is carrying out the adjacent channel search is interrupted, while the transmission to other base stations can be continued, this being possible due to the use of a multiple access method, for example a CDMA method.

In the exemplary embodiment shown in FIG. 3, voice data are being transmitted, so that a maximum delay in the evaluation of the data received by the mobile station amounting to 10 ms, or to a frame length Tf, is acceptable. The data within a frame are reorganized, jointly coded, and transmitted superimposed on one another. In the exemplary embodiment, the transmission rate for the first frame 4a and for the second frame 4b are each increased in such a manner that the same amount of information to be transmitted, and which is transmitted in uncompressed frames 1 with the frame length Tf, is transmitted in a time period Tc=Tf−Ti/2.

The following text uses FIG. 4 to explain, briefly, the conventional GSM synchronization and adjacent channel search scheme. A GSM frame transmitted by the GSM base station contains eight timeslots, each of which contains a data packet dp. The data packets transmitted by the GSM base stations BS2, such as the frequency correction data packet FB (characteristic data packet, FCCH data packet, Frequency Correction Burst), the synchronization data packet SB (the data packet which is to be detected, SCH data packet, Synchronization Burst) and the normal data packet are all subject to the same time pattern.

A GSM super frame structure includes 26 GSM frames 5 and lasts for 120 ms. During this GSM super frame structure, an idle period is inserted into the downlink, being provided for measurements, such as the adjacent channel search.

A frequency correction data packet, followed one time frame later in each case by a synchronization data packet, is transmitted by the GSM base stations four times every 10 time frames (GSM frames), and then after 111 time frames (GSM frames) (a total of 51 time frames). If interruption phases in accordance with the GSM Standard and having a period of 26 time frames (GSM frames) were now to be inserted, then the fact that the period of 51 time frames and the period of 26 time frames do not have a common denominator suggests that the two time frame periods would be shifted cyclically so that the SCH data pack sought and to be detected will be received after a maximum of 11 times 26 time frames, that is to say after 11 monitoring frames, provided the mobile station MS is not too far away from the respective adjacent base station BS2, BS3, and excessive interference does not occur in the transmission. The FCCH is arranged in frame numbers 0, 10, 20, 30 and 40. The adjacent channel search also has the aim of detecting a synchronization data packet which is to be detected. This aim also can be achieved by receiving a characteristic frequency correction data packet since, owing to the known frame structure, the position of a synchronization data packet is known once a frequency correction data packet has been received. The mobile station thus initially searches for the FCCH data packet FB 6 until, after a successful search 7, it is switched 8 to reception of the SCH data packet in the next idle period.

For the purposes of the application, the term monitoring frame also refers to a time period which is the minimum required to monitor a GSM frame. The precise duration of a monitoring frame is, in this case, a function of the implementation. However, in order to ensure complete detection of a GSM frame and in order to take account of the time required for switching the synthesizer frequency, it is generally longer than the duration of a GSM frame and may, thus, also have a duration of 9 timeslots, 10 timeslots (5.7 ms), 11 timeslots or 12 timeslots (6.9 ms).

The same scheme can be used for the adjacent channel search or for synchronization with GSM base stations during a UMTS link, with the idle periods being replaced by interruption phases, which are inserted into the UMTS downlink data stream.

The number of interruption phases which are required in order to find a FCCH data packet depends on the repetition rate of the FCCH data packets. If the number of FCCH data packets on the GSM carrier could be doubled, then the search time would be halved. However, it is probably no longer possible to introduce such a change into the existing GSM system. However, there is no need to double the number of FCCH data packets which are transmitted via a GSM super frame, but it is sufficient to ensure that twice as many data packets can be used for the purpose of synchronization, irrespective of the purpose for which these data packets are actually transmitted.

Like the FCCH data packet, the SCH data packet has a pronounced training sequence which can be used for synchronization methods which use a correlation method. With conventional synchronization methods, this training sequence is used only to correlate the sequence over a narrow range, for example of 20 bits, corresponding to the time uncertainty with which FCCH data packet timing can be defined. However, this correlation also can be extended to a longer time interval; for example, to the entire interval of an interruption phase. This allows the SCH data packet to carry out the function of the FCCH data packet and SCH data packet; that is, they can be used for rough detection and for fine, bit-accurate timing detection as well as for information detection.

Switching the mobile station to exclusive reception of the SCH data packet instead of the FCCH data packet for synchronization would result in only a minor improvement since, as soon as the SCH data packet is detected, all the necessary information would be available. In contrast, after detection of an FCCH data packet, it will still be necessary to detect the corresponding SCH data packet which is transmitted 120 ms later, wherein the average detection time would be increased by this period.

If, as explained in FIG. 5, both the FCCH data packet FB and the SCH data packet SB are used 9 in parallel for synchronization, then a search speed that is twice that of the known methods can be achieved by doubling the number of FCCH data packets.

Alternatively, the same search speed as that with conventional methods can be achieved despite the number or the duration of the interruption phases to be inserted being halved.

In general, irrespective of the duration and the number of interruption phases, the present invention allows the maximum effective total duration of the interruption phases to be roughly halved.

The reasons why this newly proposed synchronization scheme could not be used until now are not related to GSM synchronization during a UMTS link, since the mobile station can set its oscillator on the basis of the signals which are received by the UMTS base station and the frequency error is in consequence relatively low, and because UMTS mobile stations are in any case equipped with powerful correlators for Rake processing, which are not used during the interruption phases and can thus be used for correlation of the SCH training sequence. At least in the initial synchronization, a GSM station often has a considerable frequency error of several KHz. In this case, the detection process via correlation with a known training sequence does not work particularly well, and it is thus necessary to use different methods which are suitable only for the FC burst. Furthermore, the computation power required for correlation with the training sequence in the SC burst could not be implemented economically in a mobile station when GSM was introduced, but this is no longer a problem now due to progress in processor development, and since a UMTS station requires powerful correlators in any case.

For example, while the mobile station MS is in the call mode or in the user data transmission mode with a current UMTS base station BS1, the interruption phases are inserted into the downlink transmission at specific times/in specific time periods, between which there can be fixed time intervals or time intervals of different length. Also during this transmission period, the receiving device in the mobile station MS is switched to reception of data packets from respectively adjacent GSM base stations BS2, BS3.

Thus, during the interruption phase 2, the UMTS base station interrupts the transmission of data to the mobile station MS, and the mobile station MS interrupts the reception of data which are transmitted by the UMTS base station BS1. The mobile station MS uses the receiving device EE to carry out an adjacent channel search by the control device STE switching the receiving device EE to reception of adjacent GSM base stations BS2, in order to receive any synchronization data packets SB and frequency correction data packets FB which may occur and are transmitted by adjacent GSM base stations BS2, BS3.

The expression "the mobile station is switched to reception of data packets which are to be detected and to reception of characteristic data packets" also refers to, for the purposes of this application, and after the normal analogue and digital filtering and, possibly, after derotation, the received data packet being compared (for example, correlated) both with a correlation sequence corresponding to the training sequence of a characteristic data packet and with a correlation sequence corresponding to the training sequence of a data packet which is to be detected. A simultaneous or parallel search is thus carried out for data packets which are to be detected and for characteristic data packets. Other methods also may be used instead of a correlation (for example, FIR, IRR or other filters).

Since a large number of different versions are possible for inserting interruption phases for the purpose of adjacent channel searches, the expression "maximum effective total duration of the interruption phases" refers to, for the purposes of this application, the total of all the interruption phases inserted, as a maximum, for monitoring an adjacent base station. However, this does not preclude the possibility of further interruption phases being inserted when the adjacent channel search is subsequently repeated, although a new effective total duration of the interruption phases is formed in this case. The individual interruption phases may, in this case, each have the same duration as a monitoring frame, but may alternatively have any desired different duration. The duration of an interruption phase also may be a multiple or a fraction of the duration of a monitoring frame. It is also possible for the individual interruption phases to be of different durations.

One design version of the present invention provides for an interruption phase, during which the adjacent channel search is carried out, to be inserted into the UMTS downlink transmission every 104 GSM frames or every 480 ms, rather than every 26 GSM frames (120 ms) as is normal in the GSM system, which may correspond to a different number of frames in a system other than the GSM system, in particular a CDMA system. Although only a quarter of the number of interruptions required in the prior art are required in this case, half the search speed is achieved.

Instead of having to insert an interruption phase every 104 GSM frames or every 480 ms, it also has been found in the case of complex stimulation that it is particularly advantageous to insert interruption phases every 39 GSM frames, or every 180 ms.

According to a further design version, the interruptions are repeated after 47 and 57 GSM frames, respectively; that is, the interval between the first and second interruption (between the start of the first and the start of the second interruption phase) (1-2) and between the third and the fourth interruption phase (3-4) and the fifth and the sixth interruption phase (5-6) etc. is 47*4.615 ms=216.92 ms, and the interval between the second and third interruption phase (2-3) and the fourth and fifth interruption phase (4-5) and the sixth and seventh interruption phase (6-7) etc. is 57*4.615 ms=263.08 ms. Although the intervals are not the same, they are sufficiently similar for good distribution of the interruptions still to be achieved. Although only half the number of interruptions as in the prior art are required here, the resultant search speed is the same.

The pairs of values listed in the following text for the intervals between the interruption phases in GSM frame units also have been found to be particularly advantageous in complex simulations corresponding to the pair (47, 57) listed above:

(25, 28) (28, 25) (49, 57) (43, 63) (33, 73) (12, 94) (10, 96) (8, 98) (8, 100) (57, 49) (12, 25) (16,33) (33, 67) (29, 15) (35, 18) (63, 32) (87, 44) (49, 97) (26, 13)

In this case, further pairs can be formed by adding or subtracting multiples of 51 to/from each number, since the GSM pattern is repeated every 51 frames; the pairs (6, 47) or (47, 57) also can be formed from the example (57, 47) mentioned above.

One design version of the present invention provides for an interruption phase with a duration of ⅔ of a monitoring frame to be inserted every 121.33 frames, or every 560 ms.

If the mobile station MS receives a synchronization data packet SB 10 which is to be detected in one of these interruption phases, then the adjacent channel search is ended, at least with regard to this base station BS2, and, if necessary, the mobile station MS transmits appropriate control information m to the first base station BS1, the UMTS base station. Then, initially, the UMTS base station does not insert any further interruption phases into the downlink data stream d.

Since, in the GSM system, the frequency correction data packets are transmitted by the base stations BS2, BS3 one time frame before the synchronization data packets, it is possible, after reception of a characteristic frequency correction data packet FB 11, for the mobile station MS to transmit to the UMTS base station BS1 information which initially results in only one further interruption phase being inserted into the transmitted data stream, in order to receive the synchronization data packet which follows the frequency correction data packet at a fixed interval. Based on the knowledge of the relative timing between the frequency correction data packet and the synchronization data packet, the timing of the interruption phases to be inserted can be matched to the timing of the synchronization data packet which is to be detected.

Alternatively, in one design version, once a frequency correction data packet has been received, the interruption phases may continue to be inserted, with the mobile station only switched to reception of synchronization data packets during the interruption phase, or during the time period, in which a synchronization data packet SB is transmitted.

One design version of the present invention provides, first of all, for switching to a monitoring of a first adjacent GSM base station BS1 and, once a successful search has been carried out or once it is known that the search has been unsuccessful, the adjacent channel search is carried for one or more further GSM base stations BS3 and, after successful and/or unsuccessful completion of the adjacent channel search for a number of adjacent GSM base stations BS2, BS3, information m is transmitted to the UMTS base station BS1 for influencing and/or restricting and/or ending and/or controlled continuation of the insertion of interruption phases. For this purpose, the initially determined results of the adjacent channel search are temporarily stored in the mobile station MS via memory devices SPE.

In one development of the present invention, the results of the adjacent channel search, for example the identity of the adjacent base station and the reception quality or field strength of the signals received from the adjacent base stations, are transmitted to the UMTS base station together with the information for influencing the insertion of interruption phases, as a message which, if necessary, can be split between a number of frames.

If, in one design version of the present invention, the mobile station MS receives a synchronization data packet which is to be detected in one of these interruption phases, then the adjacent channel search is ended, at least with regard to this base station BS2, and the mobile station MS transmits appropriate control information m to the first base station BS1, the UMTS base station. Then, initially, the UMTS base station does not insert any further interruption phases into the downlink data stream d. This allows the effective total duration of the interruption phases to be reduced further.

One development of the present invention provides for elements of the digital signal processing in the mobile station to be switched off in interruption phases in which the mobile station is not switched to reception of data packets on the basis that sufficient information is already available about the adjacent base stations and, thus, for the power consumption of the mobile station to be reduced.

In another design version of the present invention, the first base station BS1 is also a GSM base station which transmits data in accordance with a GSM Standard, or with a standard derived from it.

The invention claimed is:

1. A method for data transmission in a mobile radio system, the method comprising the steps of:
   transmitting first data between a first base station and a mobile station using a first transmission method;
   interrupting the transmission of the first data at specific times by interruption phases in which the mobile station interrupts at least one of the reception of the first data and the processing of received first data;
   switching, during interruption phases, the mobile station to reception of characteristic data packets which are transmitted by a second base station using a second transmission method;
   switching, during interruption phases, the mobile station to reception of the data packets to be detected and transmitted by the second base station using the second transmission method, wherein the reception of data packets to be detected and the characteristic data packets occurs parallel; and
   using knowledge about a frame structure of the data packets transmitted by the second base station in order to reduce a maximum effective total duration of the interruption phases.

2. A method for data transmission in a mobile radio system, the method comprising the steps of:
   transmitting first data between a first base station and a mobile station using a first transmission method;
   interrupting the transmission of the first data at specific times by interruption phases in which the mobile station interrupts at least one of the reception of the first data and the processing of received first data;
   switching, during interruption phases, the mobile station to reception of characteristic data packets which are transmitted by a second base station using a second transmission method;
   switching, during interruption phases, the mobile station to reception of the data packets to be detected and transmitted by the second base station using the second transmission method, wherein the reception of data packets to be detected and the characteristic data packets occurs parallel; and
   using, if the transmission conditions are good, a shorter maximum effective total duration of the interruption phases for secure detection of a data packet to be detected than it would be necessary if the mobile station is switched only to receive the characteristic data packets.

3. A method for data transmission in a mobile radio system, the method comprising the steps of:
   transmitting first data between a first base station and a mobile station using a first transmission method;
   interrupting the transmission of the first data at specific times by interruption phases in which the mobile station interrupts at least one of the reception of the first data and the processing of received first data;
   switching, during interruption phases, the mobile station to reception of characteristic data packets which are transmitted by a second base station using a second transmission method;
   switching, during interruption phases, the mobile station to reception of the data packets to be detected and transmitted by the second base station using the second transmission method, wherein the reception of data packets to be detected and the characteristic data packets occurs parallel; and using knowledge about a relative position of the characteristic data packets transmitted by the second base station and of the data packets to be detected in order to reduce a maximum effective total duration of the interruption phases.

4. A method for data transmission in a mobile radio system, the method comprising the steps of:

transmitting first data between a first base station and a mobile station using a first transmission method;

interrupting the transmission of the first data at specific times by interruption phases in which the mobile station interrupts at least one of the reception of the first data and the processing of received first data;

switching, during interruption phases, the mobile station to reception of characteristic data packets which are transmitted by a second base station using a second transmission method;

switching, during interruption phases, the mobile station to reception of the data packets to be detected and transmitted by the second base station using the second transmission method, wherein the reception of data packets to be detected and the characteristic data packets occurs parallel; and transmitting, after receiving at least one of a characteristic data packet and a data packet to be detected, from the mobile station to the first base station, information which influences insertion of interruption phases.

5. A method for data transmission in a mobile radio system as claimed in claim 4, the method further comprising the step of:

transmitting, after receiving a data packet to be detected, from the mobile station to the first base station, information which results in no more interruption phases being inserted.

6. A method for data transmission in a mobile radio system as claimed in claim 4, the method further comprising the step of:

transmitting, after receiving a characteristic data packet, information from the mobile station to the first base station, which results in another interruption phase for receiving the data packet to be detected being inserted after a predetermined time interval between the characteristic data packets and the data packets to be detected.

7. A method for data transmission in a mobile radio system as claimed in claim 1, the method further comprising the steps of:

switching, after receiving at least one of a characteristic data packet and a data packet to be detected from the second base station, the mobile station to receive at least one of another characteristic data packet and a data packet to be detected from at least one third base station; and transmitting, after receiving at least one of the characteristic data packet and the data packet to be detected from the at least one third base station information from the mobile station to the first base station in order to at least one of influence the insertion of the interruption phases and transmit information via at least one of the second and third base stations.

8. A method for data transmission in a mobile radio system as claimed in claim 1, the method further comprising the step of:

storing and evaluating in a memory information transmitted via data packets from the mobile station to the second base station in a predetermined time period.

9. A method for data transmission in a mobile radio system as claimed in claim 7, the method further comprising the step of:

transmitting information for influencing insertion of the interruption phases and information about the second and the third base stations via a same message.

10. A method for data transmission in a mobile radio system as claimed in claim 7, wherein the second and third base stations are base stations in a GSM-type mobile radio system, the data packets to be detected are synchronization data packets, and the characteristic data packets are frequency correction data packets.

11. A mobile station in a mobile radio system, comprising:

a first receiver for receiving first data which are transmitted by a first base station using a first transmission method;

a second receiver for receiving data packets which are transmitted by a second base station using a second transmission method;

an inserter for inserting pauses at least during specific reception phases in which at least one of reception of first data and processing of received first data is interrupted; and a switch for switching the simultaneous reception of characteristic data packets and data packets to be detected, and transmitted by a second base station during the specific reception phases in which at least one of the reception of the first data and the processing of the received first data is interrupted, wherein the reception of data packets to be detected and the characteristic data packet occurs in parallel, and the knowledge about a frame structure of the data packets transmitted by the second base station is used in order to reduce a maximum effective total duration of interruption phases.

12. A mobile station in a mobile radio system as claimed in claim 11, further comprising:

a further switch for switching to reception of data packets which are characteristic, are to be detected and are transmitted by a third base station.

13. A mobile station in a mobile radio system as claimed in claim 11, further comprising:

an evaluator for evaluating information contained in at least one of the characteristic data packets and the data packets to be detected; and a transmitter for transmitting information to the first base station, which influences the insertion of interruption phases as a function of information which is contained in at least one of the characteristic data packets and the data packets to be detected.

14. A mobile station in a mobile radio system as claimed in claim 11, further comprising:

an evaluator for evaluating information contained in at least one of the characteristic data packets and in the data packets which are to be detected; and a switch for switching off specific elements in the mobile station in the interruption phases once sufficient information has been determined about at least one further base station.

15. A mobile station in a mobile radio system as claimed in claim 11, further comprising:

a transmitter for transmitting information to the first base station which results in no more interruption phases being inserted.

16. A mobile station in a mobile radio system as claimed in claim 11, further comprising:
a transmitter for transmitting information to the first base station which results in no more interruption phases being inserted after receiving a subsequent data packet to be detected.

17. A mobile station in a mobile radio system as claimed in claim 11, further comprising:
a transmitter for transmitting information to the first base station which results in another interruption phase for receiving the data packet to be detected being inserted after a predetermined time interval which is between the characteristic data packets and the data packets to be detected.

18. A mobile station in a mobile radio system as claimed in claim 13, further comprising:
a switch for switching to reception of at least one of a characteristic data packet and a data packet to be detected from at least one third base station after receiving at least one of a characteristic data packet and a data packet to be detected from a second base station; and
a transmitter for transmitting information to the first base station in order to at least one of influence the insertion of the interruption phases and transmit information about second and third base stations after receiving at least one of a characteristic data packet and a data packet to be detected from at least one third base station.

19. A mobile station in a mobile radio system as claimed in claim 11, further comprising:
a device for storing and evaluating data packets received by a second base station in a predetermined time period.

20. A base station in a mobile radio system, comprising:
a transmitter for transmitting first data to a mobile station using a first transmission method; and
an inserter for inserting interruption phases at least during specific transmission phases in which the mobile station interrupts the reception of at least one of the first data and the processing of received first data, and in which the mobile station is switched to the simultaneous reception of characteristic data packets and data packets to be detected and are transmitted by a second base station, wherein an effective total duration, which is required for secure detection in good transmission conditions, of the interruption phases is shorter than the effective total duration of the interruption phases when the mobile station is switched only to reception of at least one of characteristic data packets and data packets to be detected.

21. A base station in a mobile radio system as claimed in claim 20, further comprising:
a device for using knowledge about a frame structure of the data packets transmitted by the second base station in order to reduce the effective total duration of the interruption phases.

22. A base station in a mobile radio system as claimed in claim 20, further comprising:
a device for using knowledge about a relative position of the characteristic data packets and of the data packets to be detected and transmitted by the second base station, and is used to reduce a maximum effective total duration of the interruption phases.

23. A base station in a mobile radio system as claimed in claim 20, further comprising:
a receiver for receiving information which influences the insertion of interruption phases; and
a device for influencing the insertion of interruption phases as a function of the information which influences the insertion of interruption phases.

24. A base station in a mobile radio system as claimed in claim 20, further comprising:
a transmitter for transmitting data from and to a mobile station;
an inserter for inserting interruption phases at least during specific transmission phases;
a receiver for receiving information which influences the insertion of interruption phases; and
a device for influencing the insertion of interruption phases as a function of a reception result at the mobile station.

25. A base station in a mobile radio system as claimed in claim 20, further comprising:
a device for receiving and processing information which results in more than one interruption phases being inserted.

26. A base station in a mobile radio system as claimed in claim 20, further comprising:
a device for receiving and processing information which results in no more interruption phases being inserted after receiving a subsequent data packet to be detected.

27. A base station in a mobile radio system as claimed in claim 20, further comprising:
a device for receiving and processing information which results in another interruption phase for receiving the data packet to be detected being inserted after a predetermined time interval between characteristic data packets and data packets to be detected.

28. A base station in a mobile radio system as claimed in claim 20, further comprising:
a device for receiving and processing at least one of information for influencing the insertion of the interruption phases and information about at least one further base station.

29. A method for data transmission in a mobile radio system as claimed in claim 2, the method further comprising the steps of:
switching, after receiving at least one of a characteristic data packet and a data packet to be detected from the second base station, the mobile station to receive at least one of another characteristic data packet and a data packet to be detected from at least one third base station; and
transmitting, after receiving at least one of the characteristic data packet and the data packet to be detected from the at least one third base station information from the mobile station to the first base station in order to at least one of influence the insertion of the interruption phases and transmit information via at least one of the second and third base stations.

30. A method for data transmission in a mobile radio system as claimed in claim 29, the method further comprising the step of:
transmitting information for influencing insertion of the interruption phases and information about the second and the third base stations via a same message.

31. A method for data transmission in a mobile radio system as claimed in claim 29, wherein the second and third base stations are base stations in a GSM-type mobile radio system, the data packets to be detected are synchronization data packets, and the characteristic data packets are frequency correction data packets.

32. A method for data transmission in a mobile radio system as claimed in claim 3, the method further comprising the steps of:

switching, after receiving at least one of a characteristic data packet and a data packet to be detected from the second base station, the mobile station to receive at least one of another characteristic data packet and a data packet to be detected from at least one third base station; and transmitting, after receiving at least one of the characteristic data packet and the data packet to be detected from the at least one third base station information from the mobile station to the first base station in order to at least one of influence the insertion of the interruption phases and transmit information via at least one of the second and third base stations.

33. A method for data transmission in a mobile radio system as claimed in claim 32, the method further comprising the step of:

transmitting information for influencing insertion of the interruption phases and information about the second and the third base stations via a same message.

34. A method for data transmission in a mobile radio system as claimed in claim 32, wherein the second and third base stations are base stations in a GSM-type mobile radio system, the data packets to be detected are synchronization data packets, and the characteristic data packets are frequency correction data packets.

35. A method for data transmission in a mobile radio system as claimed in claim 4, the method further comprising the steps of:

switching, after receiving at least one of a characteristic data packet and a data packet to be detected from the second base station, the mobile station to receive at least one of another characteristic data packet and a data packet to be detected from at least one third base station; and transmitting, after receiving at least one of the characteristic data packet and the data packet to be detected from the at least one third base station information from the mobile station to the first base station in order to at least one of influence the insertion of the interruption phases and transmit information via at least one of the second and third base stations.

36. A method for data transmission in a mobile radio system as claimed in claim 35, the method further comprising the step of:

transmitting information for influencing insertion of the interruption phases and information about the second and the third base stations via a same message.

37. A method for data transmission in a mobile radio system as claimed in claim 35, wherein the second and third base stations are base stations in a GSM-type mobile radio system, the data packets to be detected are synchronization data packets, and the characteristic data packets are frequency correction data packets.

38. A method for data transmission in a mobile radio system as claimed in claim 2, the method further comprising the step of:

storing and evaluating in a memory information transmitted via data packets from the mobile station to the second base station in a predetermined time period.

39. A method for data transmission in a mobile radio system as claimed in claim 3, the method further comprising the step of:

storing and evaluating in a memory information transmitted via data packets from the mobile station to the second base station in a predetermined time period.

40. A method for data transmission in a mobile radio system as claimed in claim 4, the method further comprising the step of:

storing and evaluating in a memory information transmitted via data packets from the mobile station to the second base station in a predetermined time period.

41. A mobile station in a mobile radio system, comprising:

a first receiver for receiving first data which are transmitted by a first base station using a first transmission method;

a second receiver for receiving data packets which are transmitted by a second base station using a second transmission method;

an inserter for inserting pauses at least during specific reception phases in which at least one of reception of first data and processing of received first data is interrupted; and a switch for switching the simultaneous reception of characteristic data packets and data packets to be detected, and transmitted by a second base station during the specific reception phases in which at least one of the reception of the first data and the processing of the received first data is interrupted, wherein the reception of data packets to be detected and characteristic data packets occurs in parallel, and if the transmission conditions are good, a shorter maximum effective total duration of the interruption phases for secure detection of a data packet to be detected is used than it would be necessary if the mobile station is switched only to receive the characteristic data packets.

42. A mobile station in a mobile radio system as claimed in claim 41, further comprising:

a further switch for switching to reception of data packets which are characteristic, are to be detected and are transmitted by a third base station.

43. A mobile station in a mobile radio system as claimed in claim 41, further comprising:

an evaluator for evaluating information contained in at least one of the characteristic data packets and the data packets to be detected; and a transmitter for transmitting information to the first base station, which influences the insertion of interruption phases as a function of information which is contained in at least one of the characteristic data packets and the data packets to be detected.

44. A mobile station in a mobile radio system as claimed in claim 41, further comprising:

an evaluator for evaluating information contained in at least one of the characteristic data packets and in the data packets which are to be detected; and a switch for switching off specific elements in the mobile station in the interruption phases once sufficient information has been determined about at least one further base station.

45. A mobile station in a mobile radio system as claimed in claim 41, further comprising:

a transmitter for transmitting information to the first base station which results in no more interruption phases being inserted.

46. A mobile station in a mobile radio system as claimed in claim 41, further comprising:

a transmitter for transmitting information to the first base station which results in no more interruption phases being inserted after receiving a subsequent data packet to be detected.

47. A mobile station in a mobile radio system as claimed in claim 41, further comprising:

a transmitter for transmitting information to the first base station which results in another interruption phase for receiving the data packet to be detected being inserted after a predetermined time interval which is between the characteristic data packets and the data packets to be detected.

48. A mobile station in a mobile radio system as claimed in claim 41, further comprising:
a switch for switching to reception of at least one of a characteristic data packet and a data packet to be detected from at least one third base station after receiving at least one of a characteristic data packet and a data packet to be detected from a second base station; and
a transmitter for transmitting information to the first base station in order to at least one of influence the insertion of the interruption phases and transmit information about second and third base stations after receiving at least one of a characteristic data packet and a data packet to be detected from at least one third base station.

49. A mobile station in a mobile radio system as claimed in claim 41, further comprising:
a device for storing and evaluating data packets received by a second base station in a predetermined time period.

50. A mobile station in a mobile radio system, comprising:
a first receiver for receiving first data which are transmitted by a first base station using a first transmission method;
a second receiver for receiving data packets which are transmitted by a second base station using a second transmission method;
an inserter for inserting pauses at least during specific reception phases in which at least one of reception of first data and processing of received first data is interrupted; and
a switch for switching the simultaneous reception of characteristic data packets and data packets to be detected, and transmitted by a second base station during the specific reception phases in which at least one of the reception of the first data and the processing of the received first data is interrupted, wherein
the reception of data packets to be detected and characteristic data packets occurs in parallel, and
the knowledge about a relative position of the characteristic data packets transmitted by the second base station and of the data packets to be detected is used in order to reduce a maximum effective total duration of interruption phases.

51. A mobile station in a mobile radio system as claimed in claim 50, further comprising:
a further switch for switching to reception of data packets which are characteristic, are to be detected and are transmitted by a third base station.

52. A mobile station in a mobile radio system as claimed in claim 50, further comprising:
an evaluator for evaluating information contained in at least one of the characteristic data packets and the data packets to be detected; and
a transmitter for transmitting information to the first base station, which influences the insertion of interruption phases as a function of information which is contained in at least one of the characteristic data packets and the data packets to be detected.

53. A mobile station in a mobile radio system as claimed in claim 50, further comprising:
an evaluator for evaluating information contained in at least one of the characteristic data packets and in the data packets which are to be detected; and a switch for switching off specific elements in the mobile station in the interruption phases once sufficient information has been determined about at least one further base station.

54. A mobile station in a mobile radio system as claimed in claim 50, further comprising:
a transmitter for transmitting information to the first base station which results in no more interruption phases being inserted.

55. A mobile station in a mobile radio system as claimed in claim 50, further comprising:
a transmitter for transmitting information to the first base station which results in no more interruption phases being inserted after receiving a subsequent data packet to be detected.

56. A mobile station in a mobile radio system as claimed in claim 50, further comprising:
a transmitter for transmitting information to the first base station which results in another interruption phase for receiving the data packet to be detected being inserted after a predetermined time interval which is between the characteristic data packets and the data packets to be detected.

57. A mobile station in a mobile radio system as claimed in claim 50, further comprising:
a switch for switching to reception of at least one of a characteristic data packet and a data packet to be detected from at least one third base station after receiving at least one of a characteristic data packet and a data packet to be detected from a second base station; and
a transmitter for transmitting information to the first base station in order to at least one of influence the insertion of the interruption phases and transmit information about second and third base stations after receiving at least one of a characteristic data packet and a data packet to be detected from at least one third base station.

58. A mobile station in a mobile radio system as claimed in claim 50, further comprising:
a device for storing and evaluating data packets received by a second base station in a predetermined time period.

59. A mobile station in a mobile radio system, comprising:
a first receiver for receiving first data which are transmitted by a first base station using a first transmission method;
a second receiver for receiving data packets which are transmitted by a second base station using a second transmission method;
an inserter for inserting pauses at least during specific reception phases in which at least one of reception of first data and processing of received first data is interrupted; and
a switch for switching the simultaneous reception of characteristic data packets and data packets to be detected, and transmitted by a second base station during the specific reception phases in which at least one of the reception of the first data and the processing of the received first data is interrupted, wherein
the reception of data packets to be detected and characteristic data packets occurs in parallel, and
after receiving at least one of a characteristic data packet and a data packet to be detected from the mobile station to the first base station, information is transmitted which influences insertion of interruption phases.

60. A mobile station in a mobile radio system as claimed in claim 59, further comprising:
a further switch for switching to reception of data packets which are characteristic, are to be detected and are transmitted by a third base station.

61. A mobile station in a mobile radio system as claimed in claim 59, further comprising:
- an evaluator for evaluating information contained in at least one of the characteristic data packets and the data packets to be detected; and
- a transmitter for transmitting information to the first base station, which influences the insertion of interruption phases as a function of information which is contained in at least one of the characteristic data packets and the data packets to be detected.

62. A mobile station in a mobile radio system as claimed in claim 59, further comprising:
- an evaluator for evaluating information contained in at least one of the characteristic data packets and in the data packets which are to be detected; and
- a switch for switching off specific elements in the mobile station in the interruption phases once sufficient information has been determined about at least one further base station.

63. A mobile station in a mobile radio system as claimed in claim 59, further comprising:
- a transmitter for transmitting information to the first base station which results in no more interruption phases being inserted.

64. A mobile station in a mobile radio system as claimed in claim 59, further comprising:
- a transmitter for transmitting information to the first base station which results in no more interruption phases being inserted after receiving a subsequent data packet to be detected.

65. A mobile station in a mobile radio system as claimed in claim 59, further comprising:
- a transmitter for transmitting information to the first base station which results in another interruption phase for receiving the data packet to be detected being inserted after a predetermined time interval which is between the characteristic data packets and the data packets to be detected.

66. A mobile station in a mobile radio system as claimed in claim 59, further comprising:
- a switch for switching to reception of at least one of a characteristic data packet and a data packet to be detected from at least one third base station after receiving at least one of a characteristic data packet and a data packet to be detected from a second base station; and
- a transmitter for transmitting information to the first base station in order to at least one of influence the insertion of the interruption phases and transmit information about second and third base stations after receiving at least one of a characteristic data packet and a data packet to be detected from at least one third base station.

67. A mobile station in a mobile radio system as claimed in claim 59, further comprising:
- a device for storing and evaluating data packets received by a second base station in a predetermined time period.

* * * * *